(12) United States Patent
Zhang et al.

(10) Patent No.: US 9,204,103 B1
(45) Date of Patent: Dec. 1, 2015

(54) TECHNIQUE FOR PARALLEL, DISTRIBUTED VIDEO PROCESSING

(75) Inventors: Feng Zhang, Sherborn, MA (US); Bo Huang, Shanghai (CN); Qiang Zou, Shanghai (CN); Qin Xin, Broken Arrow, OK (US); Qi Bao, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 954 days.

(21) Appl. No.: 13/402,331

(22) Filed: Feb. 22, 2012

Related U.S. Application Data

(60) Provisional application No. 61/582,128, filed on Dec. 30, 2011.

(51) Int. Cl.
*H04N 7/18* (2006.01)

(52) U.S. Cl.
CPC ...................................... *H04N 7/18* (2013.01)

(58) Field of Classification Search
None
See application file for complete search history.

(56) References Cited

U.S. PATENT DOCUMENTS

| | | | |
|---|---|---|---|
| 2012/0026344 A1* | 2/2012 | Ezoe et al. | 348/207.1 |
| 2012/0076357 A1* | 3/2012 | Yamamoto et al. | 382/103 |
| 2012/0290541 A1* | 11/2012 | Anderson et al. | 707/685 |
| 2013/0044219 A1* | 2/2013 | Burry et al. | 348/149 |

OTHER PUBLICATIONS

Aguilera et al., "Using Erasure Codes Efficiently for Storage in a Distributed Aystem", Proc. of the 2005 Int. Conf. on Dependable Systems and Networks (DSN'05), IEEE Computer Society, 2005.
Castro et al., "Topology-Aware Routing in Structured Peer-to-Peer Overlay Networks", A. Schiper et al. (Eds.), Future Directions in DC 2002, pp. 103-107, 2003.
Chang et al., "Bigtable: A Distributed Storage System for Structured Data", ACM. Trans. Comput. Syst. 26, 2, Article 4, Jun. 2008.
DeCandia et al., "Dynamo: Amazon's Highly Available Key-Value Store", SOSP'07, Oct. 14-17, 2007, Stevenson, Washington.
Dabek et al., "Designing a DHT for Low Latency and High Throughput", NSDI'04 Technical Paper, retrieved from http://static.usenix.org/events/nsdiO4/tech/full_papers/dabek/dabek_html/ on Jul. 19, 2012.
Dabek et al., "Vivaldi: A Decentralized Network Coordinate System", SIGCOMM'04, Aug. 30-Sep. 3, 2004, Portland, Oregon.
Goodson et al., "Efficient Byzantine-Tolerant Erasure-Coded Storage", Proc. of the 2004 Int. Conference on Dependable Systems and Networks (DSN'04), IEEE Computer Society, 2004.
Greenan et al., "Reliability of XOR Based Erasure Codes on Heterogeneous Devices", International Conference on Dependable Systems and Networks, Anchorage, AK, pp. 147-156, Jun. 24-27, 2008.

(Continued)

*Primary Examiner* — William C Vaughn, Jr.
*Assistant Examiner* — Eileen Adams
(74) *Attorney, Agent, or Firm* — BainwoodHuang (57) ABSTRACT

An improved technique for storing and processing video data includes separating video data derived from a video camera into multiple video fragments, distributing the video fragments to different computing nodes of a network, and performing parallel image processing on the video fragments in a distributed manner, by the respective computing nodes that receive the video data. Examples of image processing include pattern matching, such as facial recognition, and license plate matching.

17 Claims, 5 Drawing Sheets

(56) References Cited

OTHER PUBLICATIONS

Greenan, "Reliability and Power-Efficiency in Erasure-Coded Storage Systems", Technical Report UCSC-SSRC-09-08, University of California, Santa Cruz, Dec. 2009.

Hafner et al., "Notes on Reliability Models for Non-MDS Erasure Codes", IBM report, 2006.

Lakshman et al., "Cassandra—A Decentralized Structured Storage System", ACM SIGOPS Operating Systems Review, vol. 44, Issue 2, pp. 35-40, Apr. 2010.

Prasad et al. "Bandwidth Estimation: Metrics, Measurement Techniques, and Tools", IEEE Network, vol. 17, Issue 6, pp. 27-35, Nov./Dec. 2003.

Ratnasamy et al., "A Scalable Content-Addressable Network", SIGCOMM01, Aug. 27-31, 2001, San Diego, CA.

Ratnasamy et al., "Topologically-Aware Overlay Construction and Server Selection", INFOCOM2002, 21st Annual Joint Cont. of the IEEE Comp. and Com. Societies, pp. 1190-1199, 2002.

Rowstron et al., "Pastry: Scalable, Distributed Object Location and Routing for Large-Scale Peer-to-Peer Systems", R. Guerraoui (Ed.), Middleware 2001, pp. 329-350, 2001.

Stoica et al., "Chord: A Scalable Peer-to-Peer Lookup Service for Internet Applications", SIGCOMM'01, Aug. 27-31, 2001, San Diego, CA.

Weatherspoon, Hakim, "Design and Evaluation of Distributed Wide-Area On-line Archival Storage Systems", Appears in University of California, Berkeley PhD Dissertation, Technical Report No. UCB/EECS-2006-130, Oct. 13, 2006.

Weil et al., "CRUSH: Controlled, Scalable, Decentralized Placement of Replicated Data", SC2006, Nov. 2006, Tampa, FL.

* cited by examiner

TECHNIQUE FOR PARALLEL, DISTRIBUTED VIDEO PROCESSING

CROSS REFERENCE TO RELATED APPLICATIONS

This application claims the benefit under 35 U.S.C. §119 (e) of U.S. Provisional Application Ser. No. 61/582,128 entitled "TECHNIQUES FOR DATA PARTITIONING AND STORAGE IN CONNECTION WITH VIDEO," filed on Dec. 30, 2011, the contents and teachings of which are hereby incorporated by reference in their entirety.

BACKGROUND

Video systems, such as those used for surveillance, typically involve numerous video cameras. The video cameras are typically positioned within and around a building or other property to capture multiple views of the property. In some conventional schemes, the video cameras store video content locally, e.g., on a tape. The tape is typically changed frequently, kept in storage in a central location for some period of time, and referred back to, if any suspect activity occurs, to retrieve video images associated with the suspect activity.

In other conventional schemes, video cameras from different property locations may generate live video feeds, e.g., via closed circuit TV, which are sent to a central location, where numerous video feeds may be viewed side-by-side, simultaneously, and recorded centrally.

In still other conventional schemes, video cameras are provided in connection with processors that connect to a computer network. The video cameras acquire video data from respective locations, and the processors transmit the video data over the computer network to a centralized server, which may receive and process the video data.

SUMMARY

Unfortunately, video data acquired and stored using prior approaches can be vulnerable to data loss. For example, tapes can be lost or damaged. Even video data acquired over a network and stored on a centralized server can be lost, such as in the event of a disk drive failure, power failure, environmental catastrophe, or malicious attack.

Also, centralized servers processing video data from multiple cameras can easily become overburdened. For example, it may be desired to perform CPU intensive pattern matching operations on the video data, such as facial recognition. In response to high demands for CPU power, sophisticated centralized installations may be constructed, with multiple CPUs performing parallel pattern matching. But these installations are still vulnerable to localized failures, catastrophes, and attacks.

In contrast with these prior approaches, which are vulnerable to data loss and may place high processing demands on centralized CPUs, an improved technique for storing and processing video data includes separating video data derived from a video camera into multiple video fragments, distributing the video fragments to different computing nodes of a network, and performing parallel image processing on the video fragments in a distributed manner, by the respective computing nodes that receive the video data. Since video data are processed by multiple computing nodes in a distributed manner, individual CPUs are generally not overburdened, and the need for high-performance, centralized processors is avoided. Also avoided is much of the risk involved in centralized processing, where all data may be lost in response to a single event.

In some examples, video fragments are subjected to an erasure coding operation to produce parity fragments, which themselves are stored on different computing nodes of the network in a distributed manner. In general, a total of N fragments are created, of which K fragments are video fragments and N−K fragments are parity fragments. With this approach, up to N−K fragments (either video or parity) may be lost or damaged without any data loss, i.e., the original K video fragments can be reconstructed as long as any K fragments of video or parity remain. Video fragments and parity fragments may be stored in a distributed manner, e.g., on the same computing nodes that receive respective video fragments for processing. The combination of distributed storage of video fragments with erasure coding promotes data reliability, as it is unlikely that a single event can cause damage to enough fragments to result in data loss.

In accordance with certain embodiments, a video processing method includes receiving video information from a video camera, producing, from the video information, multiple video fragments, and distributing the video fragments to multiple computing nodes of a network, including distributing different video fragments to different computing nodes of the network. The method further includes performing a pattern matching operation on each video fragment by the respective computing node to which the video fragment is distributed, including determining whether the video fragment includes a video representation of a predetermined target.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION

Improved techniques for storing and processing video data include separating video data derived from a video camera into multiple video fragments, distributing the video fragments to different computing nodes of a network, and performing parallel image processing on the video fragments in a distributed manner, by the respective computing nodes that receive the video data. As will be described, these techniques avoid the need for centralized video processing, which can quickly overburden computer hardware, and distribute data in redundant form across different nodes of a network, where data are much more resistant to loss than they would be if stored centrally.

Figure 1:
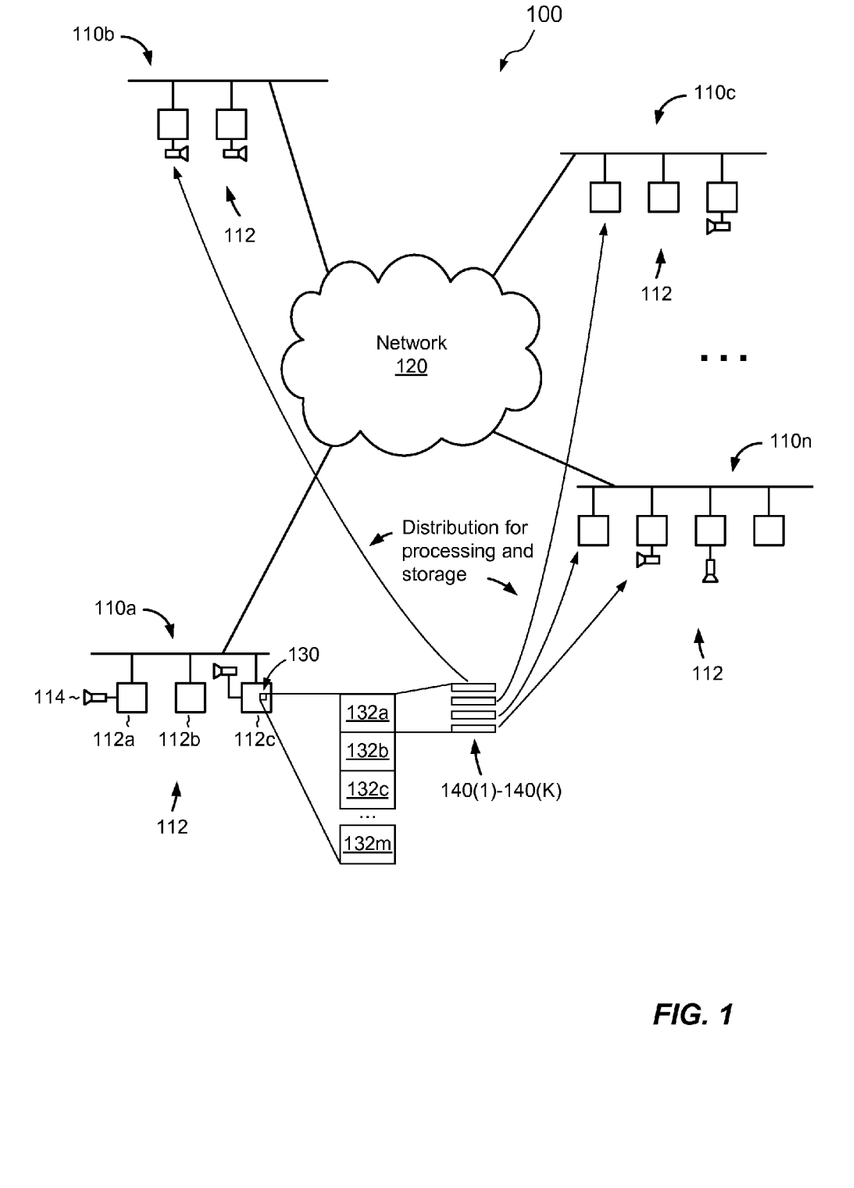
FIG. 1 is a simplified schematic of an example environment in which video data acquired from one computing node may be distributed to other computing nodes of a network for processing and storage.

FIG. 1 shows an example environment 100 in which the improved techniques hereof may be employed. The environment 100 includes a number of local area networks (LANs) 110a-n. The LANs 110a-n are interconnected via a network 120. Each LAN 110a-n includes a number of computing nodes 112 (e.g., nodes 112a-c of LAN 110a). Some of the computing nodes 112 may include a video camera 114. The video camera 114 of an example computing node 112c obtains a set of data 130, such as video data. The set of data 130 may be provided in the form of a file or some other supply of data, such as a stream, for example. The set of data 130 may be divided into chunks 132a-m, and each chunk may be further divided into a set of video fragments 140(1)-140(K). In some arrangements, video fragments 140 are stored in the environment 100 in a distributed manner, where the K video fragments 140(1)-140(K) are placed on K different computing nodes 112. However, this is not required. In other arrangements, the K video fragments 140(1)-140(K) are placed on fewer than K nodes of the network 120. Some video fragments 140(1)-140(K) may be stored on the node 112c, from which the video data 130 originates, while others may be placed on other nodes of the network. In addition, erasure coding may be applied to the video fragments 140(1)-140(K) to produce parity fragments. The provision of both video fragments 140(1)-140(K) and parity fragments ensures that the original video data can be reconstructed even if some of the video fragments or parity fragments are damaged.

Once the video fragments 140(1)-140(K) are sent to different computing nodes 112 of the network 120, the computing nodes to which the fragments are sent perform local video processing on the respective fragments. The video processing may include pattern matching, such as facial recognition or license plate matching, for example, where images from the respective video fragments 140(1)-140(K) are compared with a list of suspect targets. By distributing video data 130 across multiple computing nodes 112 of the network 120, parallel video processing may take place in a distributed fashion across the network 120, with each computing node 112 performing a relatively small, manageable processing task on a relatively small amount of data.

It is understood that multiple computing nodes 112 of the environment 100 may each acquire video data 130, from their respective locations, in a manner similar to that described above with respect to the node 112c, with each such node 112 dividing the video data 130 into chunks 132a-m and fragments 140(1)-140(K) and transmitting the fragments to other nodes 112 of the network 120, for distributed, parallel video processing. Further, at least some of the nodes 112 on the network 120 may act as both sources of video data (e.g., from respective video cameras 114) and as sites of video processing and storage, for video data acquired from other computing nodes 112.

It is further understood that the computing nodes 112 need not belong to any of the particular LANs 110a-n or to any LAN, and may connect to other computing nodes 112 directly or through the network 120. The network 120 can itself be any type of network, including a LAN, a wide area network (WAN), the Internet, a cell phone network, a data network, a satellite network, or any combination of these, for example. The computing nodes 112 may be provided in any suitable form, such as servers, laptop computers, desktop computers, tablets, smart phones, PDA's, or any combination of these, for example. Different computing nodes 112 may be provided in different forms. For example, some computing nodes 112 may include video cameras but little data storage, whereas other computing nodes 112 may include large storage arrays. Still others may include high performance processors. It is therefore understood that the environment 100 may include diverse types of computing nodes 112.

In some examples, the environment 100 is part of an overlay network. The overlay network may be provided as a hierarchical cluster tree, wherein LANs form the lowest level clusters. Higher order clusters consist of multiple LANs grouped based on proximity (e.g., number of hops returned using a traceroute function). Each cluster has a proximity requirement, with lower-order clusters including only clusters whose LANs are physically close to one another and higher-order clusters containing clusters whose LANs are more physically distant from one another. The resulting hierarchical cluster tree provides an overlay to an existing network (e.g., the Internet). As its organization is based on physical proximity, the hierarchical cluster tree, of which the environment 100 may be a part, allows for particularly efficient distributed storage of data.

Figure 2:
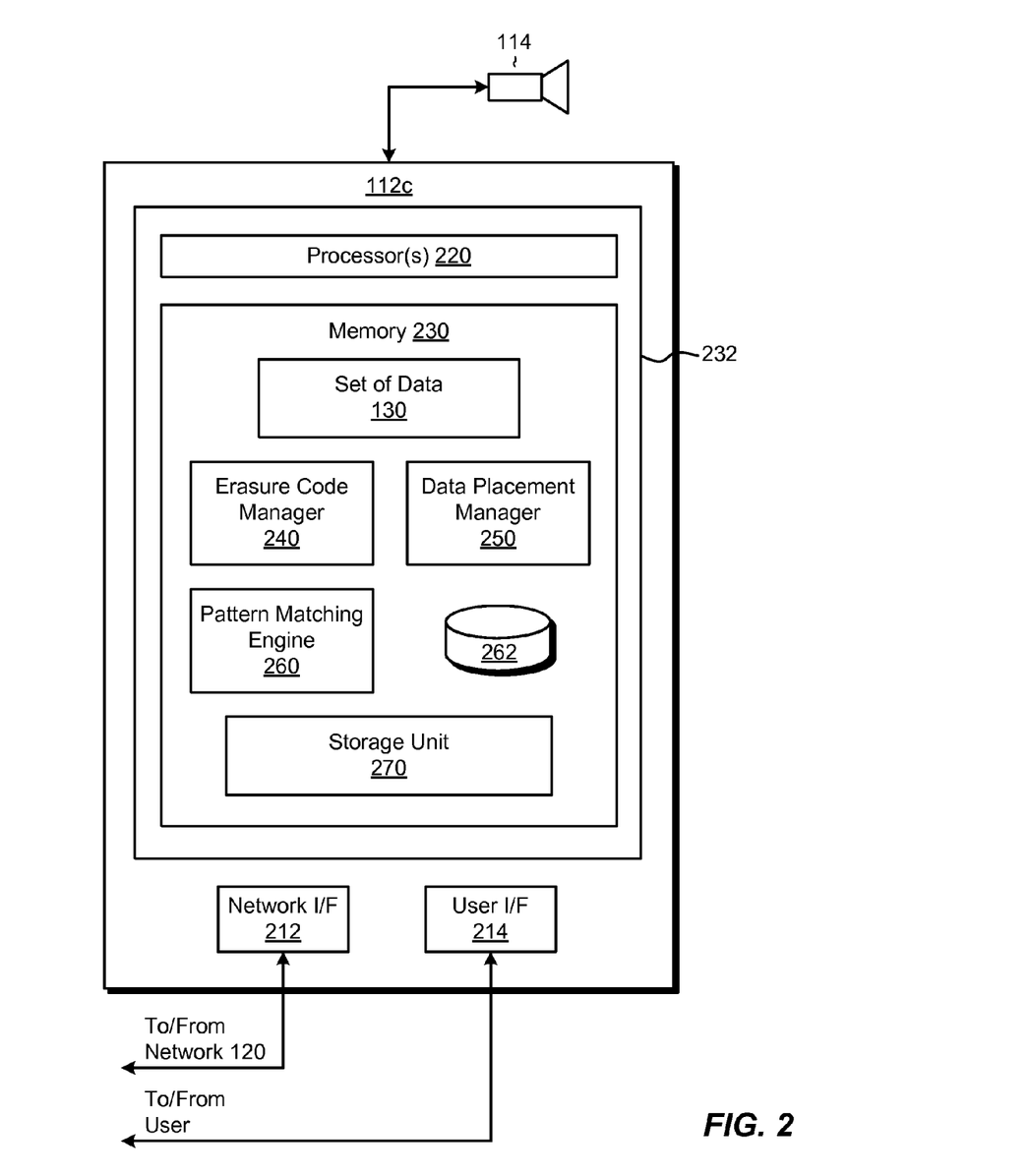
FIG. 2 is a block diagram of an example computing node of FIG. 1.

FIG. 2 shows the computing node 112c of FIG. 1 in greater detail. The characteristics of the computing node 112c may be common to many of the computing nodes 112; however, it is expected that the details of different computing nodes 112 may differ. As shown, the computing node 112c is a computerized apparatus that includes a set of processors 220 (e.g., one or more processing chips and/or assemblies), memory 230, including both volatile and non-volatile memory, a network interface 212 for connecting the computing node 112c to the network 120, and a user interface 214 for interacting with a user. The set of processors 220 and the memory 230 together form a specialized circuit 232, which is constructed and arranged to perform functions and methods as described herein.

The memory 230 includes an operating system, programs, and other software constructs and data. Of particular relevance, the memory 230 includes the set of data 130 (e.g., video data acquired from the video camera 114), an erasure code manager 240, a data placement manager 250, a pattern matching engine 260, a database 262 of known targets, and a storage unit 270, such as a disk drive or other non-volatile storage device or set of devices.

The erasure code manager 240 applies erasure coding to data fragments (e.g., 140(1)-140(K)) to produce parity fragments. As is known, any chunk 132a-m containing K fragments may be erasure coded to produce a total of N fragments, which includes the original K fragments as well as N−K parity fragments. Using erasure coding techniques, up to N−K of the total fragments (either video or parity) may be damaged without permanent data loss. Thus, as long as at least K fragments remain (either video or parity fragments), all K fragments of video that make up the respective chunk can be regenerated.

The data placement manager 250 identifies nodes 112 of the network 120 on which to store fragments. The data placement manager 250 may place fragments based on a number of factors, such as physical proximity of other nodes 112 to the node 112c or to one another, available data processing capabilities of different nodes 112, and network traffic in different portions of the network 120. The data placement manager 250 may operate in coordination with data placement managers 250 of other nodes 112 of the network 120 to place video and parity fragments on nodes 112 of the network 120.

The pattern matching engine 260 operates in conjunction with the database 262 to perform pattern matching against predetermined targets. In general, video images are extracted from fragments 140(1)-140(K) of the video data 130 and compared with targets stored in the database 262. Where the pattern matching engine 260 performs facial recognition, the targets stored in the database 262 may include facial information (such as facial geometry). Where the pattern matching engine 260 performs license plate matching, the targets may include license plate numbers and/or other license plate information. The pattern matching engine 260 may perform other types of pattern matching; facial recognition and license plate matching are presented merely as examples. The pattern matching engine 260 and the database 262 are provided for the case where the node 112c processes video fragments that have been distributed to the computing node 112c from other nodes 112, or to the case where the node 112c processes video fragments that it acquires itself.

Some computing nodes 112 may be configured only to source video data, whereas others may be configured only to receive video data. Still others (like the node 112c) may be configured both to source and receive video data. Where a node 112 is configured to source video data but not to receive it, the pattern matching engine 260 and database 262 may be omitted. Where a node 112 is configured to receive video data but not to source it, the erasure code manager 240 and data placement manager 250 may be omitted.

Figure 3:
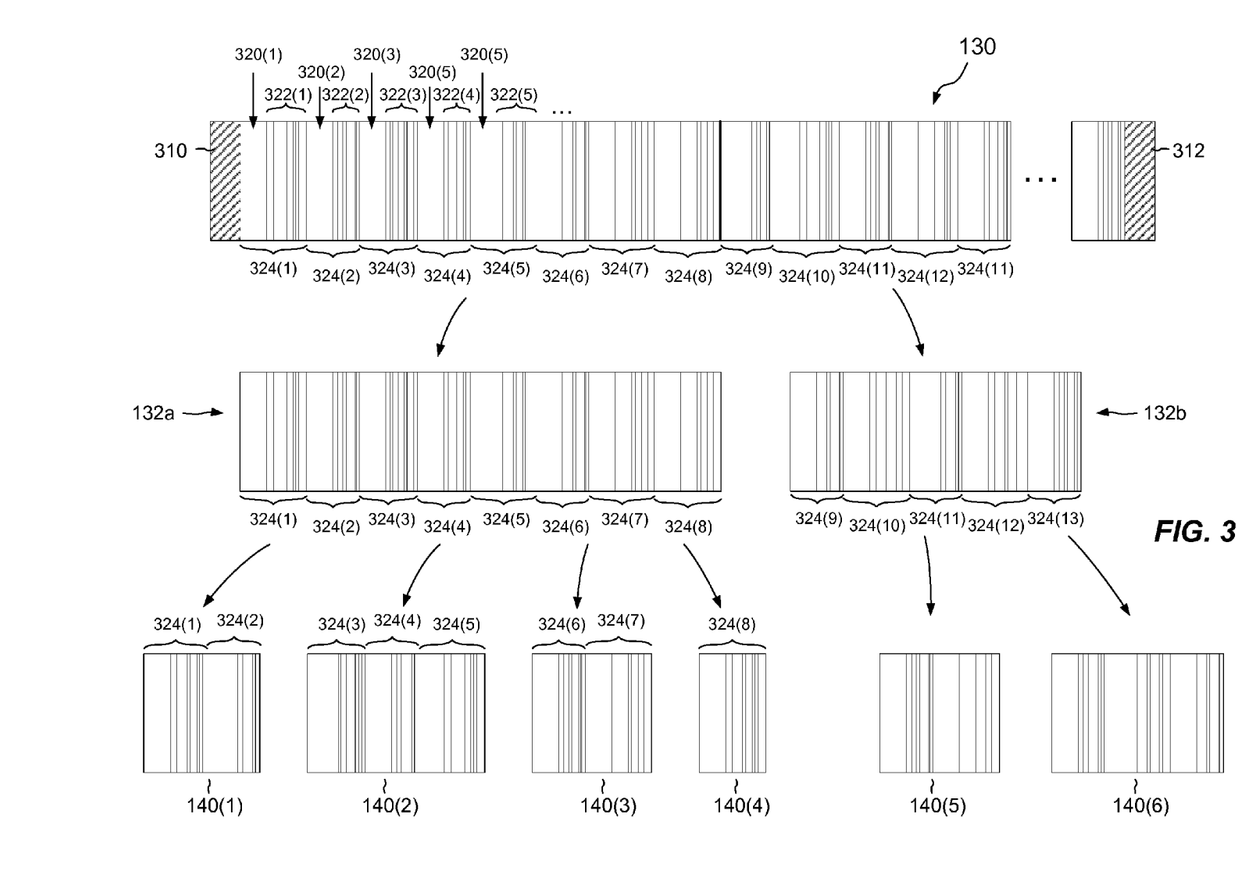
FIG. 3 is a diagram showing an example set of video data, which can be divided into chunks and fragments.

FIG. 3 shows an example of video data 130, e.g., acquired from the video camera 114, divided into chunks 132a and 132b, and then subdivided into video fragments 140(1)-140(4) and 140(5)-140(6). In the illustrated example, the video data 130 is intended to shown an MPEG-4 video file; however, the video data 130 can be provided in any video format, and need not be provided in the form of a file. For example, the video data 130 may be provided as a file, a stream, or any other supply of video information.

As shown, the video data 130 may include a beginning segment 310 and an ending segment 312. In the case of MPEG-4 files, the beginning segment 310 and ending segment 312 are used before and after video frames to designate video metadata, which assist in identifying video frames within the video data 130. The video frames are provided as two main types: complete frames, such as frames 320(1)-320(5); and inter-frames, such as frame groupings 322(1)-322(5). The groups of inter-frames 322(1)-322(5) are labeled collectively for simplicity; it is understood, however, that each group 322(1)-322(5) typically includes multiple individual inter-frames.

Each complete frame 320(1)-320(5) represents a still video image, i.e., a picture. In contrast, each inter-frame represents an incomplete video frame that forms an incomplete video image. The incomplete video image for an inter-frame is based on a difference between video content captured for the inter-frame and the preceding complete frame and/or inter-frames. Complete frames 320(1)-320(5) are typically much larger than inter-frames 322(1)-322(5), as they represent complete pictures as opposed to differences. The smaller sizes of inter-frames 322(1)-322(5) promote video compression.

In MPEG-4 terminology, the complete frames 320(1)-320(5) are customarily referred to as "I-frames" of "key frames." MPEG-4 inter-frames are customarily provided in two forms, "P-frames," which define forward predicted pictures, and "B-frames," which define bidirectionally predicted pictures.

During video playback, an algorithm is applied to generate complete video frames for each inter-frame based on the preceding complete frame and any preceding inter-frames. Without the preceding complete frame and inter-frames, reconstruction of complete video data from inter-frames cannot occur.

The video data 130 can thus be regarded as containing multiple video sequences, e.g., 324(1)-324(8), where each video sequence includes a single complete frame (e.g., an I-frame) and a succeeding group of inter-frames (e.g., P-frames and/or B-frames) that are based on the complete frame. As long as all frames of a sequence are kept together, all inter-frames included in the sequence can be reconstructed for playback.

As shown, various chunks (e.g., 132a and 132b) can be identified within the video data 130. Each chunk contains a sequential section of the video data 130 and preferably includes an integer number of video sequences (e.g., chunk 132a includes sequences 324(1)-324(8) and chunk 132b includes sequences 324(9)-324(13)).

Various video fragments can be identified within each chunk. For example, video fragments 140(1)-140(4) can be identified within chunk 132a and video fragments 140(5) and 140(6) can be identified within chunk 132b. As with chunks, each video fragment includes a sequential section of the video data 130 and preferably includes an integer number of video sequences. For example, video fragment 140(1) includes sequences 324(1) and 324(2), video fragment 140(2) includes sequences 324(3), 324(4), and 324(5), video fragment 140(3) includes sequences 324(6) and 324(7), and video fragment 140(4) includes video fragment 324(8).

In some examples, the sizes of chunks are determined based on erasure coding efficiency. Erasure codes (e.g., parity fragments) can in general be computed more efficiently from larger chunks; however, chunk size may be limited by available memory and processing power.

In some examples, the sizes of fragments are determined based on the processing power of nodes 112 and the extent to which it is desired to disperse the video data. Smaller fragments are associated with larger numbers of fragments and therefore typically with placement across a larger number of nodes 112, where each node has a relatively little amount of video data to process. Larger fragments may be stored on fewer nodes 112, but each node has a relatively large amount of video data to process.

In some examples, the division of the video data 130 into chunks and fragments takes place by first identifying the location of each complete frame in the video data 130. A data partition algorithm for an MPEG-4 file can calculate the offsets of I-frames and non-media data based on I-frame offset locations. The video file is then partitioned based on the offset locations. The partition algorithm includes two main steps. First, a file offset point for each I-frame is calculated based on information included in the video metadata stored beginning and/or ending segments 310 and 312. A fragment size is selected. Second, the MPEG-4 file is partitioned into different data blocks based on the I-frame file offset points. Each video fragment is made to hold as many data blocks as possible within the pre-selected fragment size.

To calculate the offset of each I-frame, the technique first finds a "sync sample table" box in the video metadata of the MPEG-4 file and records all sample numbers of random access points. Next, the technique finds a "sample-to-chunk" box in the MPEG-4 file and locates all the chunk numbers in which the random access point samples are included. The positions of the random access point samples in the chunks are recorded. Next, the technique finds a "chunk offset" box and determines the file offset of all the chunks that have the random access points recorded in them. Finally, a "sample size" box is found. The sizes of all samples are recorded. The I-frame offset is then calculated as the sum of the chunk offset and the respective sample size.

In the example described above, the MPEG-4 file (or other video source) is divided into chunks, and then the chunks are divided into fragments. In other examples, the video file may be initially divided into sequences (e.g., 324(1-13)), the sequences can be assembled into video fragments (e.g., 140(1-6)), and the video fragments can be assembled into chunks (e.g., 132a, 132b). Once a chunk and its constituent fragments are identified, the fragments of a chunk can be erasure coded to produce parity fragments.

Figure 4:
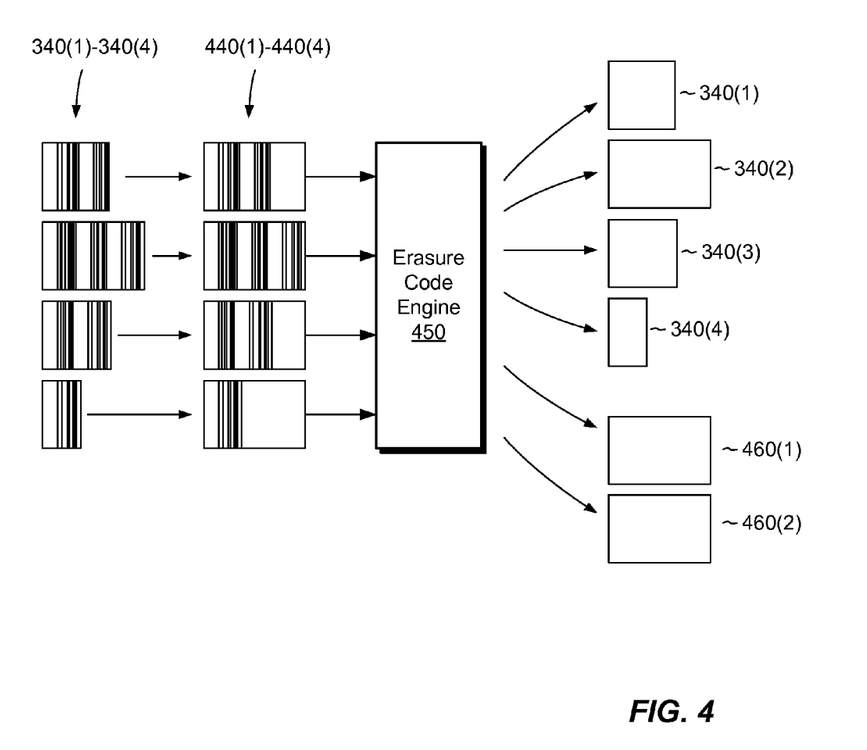
FIG. 4 is a block diagram showing an example process for erasure coding multiple video fragments to create multiple parity fragments.

FIG. 4 shows an example technique for producing erasure code (e.g., parity) fragments, using the example of fragments 340(1)-340(4) of the chunk 132a. This technique may be conducted by the erasure code manager 240, shown in FIG. 2.

It is observed that the fragments 340(1)-340(4) are different sizes. This is due in part to the fact that the illustrated fragments have different numbers of sequences. The sizes of fragments will typically be different even if the number of sequences in each fragment is the same, however, because the sizes of inter-frames vary based on the degree of difference between the inter-frames and their preceding complete frames. Different size fragments can typically not be erasure coded directly, as erasure coding generally operates only on identically sized fragments.

Prior to subjecting the fragments 340(1)-340(4) to an erasure coding engine 450, the fragments are first "padded" to equalize their sizes. Typically, padding consists of adding data to smaller fragments to make them the same size as the largest fragment. The fragments can be padded with any recognizable data, such as all zeros, all ones, or some predetermined pattern.

Padded video fragments 440(1)-440(4) can then be encoded by the erasure code engine 450 to produce parity fragments 460(1) and 460(2). In this example, a total of 6 fragments are produced (i.e., N=6), of which four fragments are video fragments (i.e., K=4) and two fragments are parity (i.e., N−K=2). Although only two parity fragments are shown, it is understood that any number of parity fragments can be created, based on the desired level of redundancy and resistance to data loss. In some examples, the padding operation occurs solely in memory, its purpose being to enable the creation of parity fragments 460(1) and 460(2). Once the parity fragments 460(1) and 460(2) are created, the padded video fragments 440(1)-440(4) serve no further purpose and may be discarded.

The parity fragments 460(1-2) can be placed in various nodes 112 of the network 120, along with the video fragments 340(1)-340(4). Preferably, the unpadded video fragments 340(1)-340(4) are placed, rather than the padded fragments 440(1)-440(4), as the unpadded fragments require less network activity to place and less storage space on the computing nodes 112 to which they are distributed.

Figure 5:
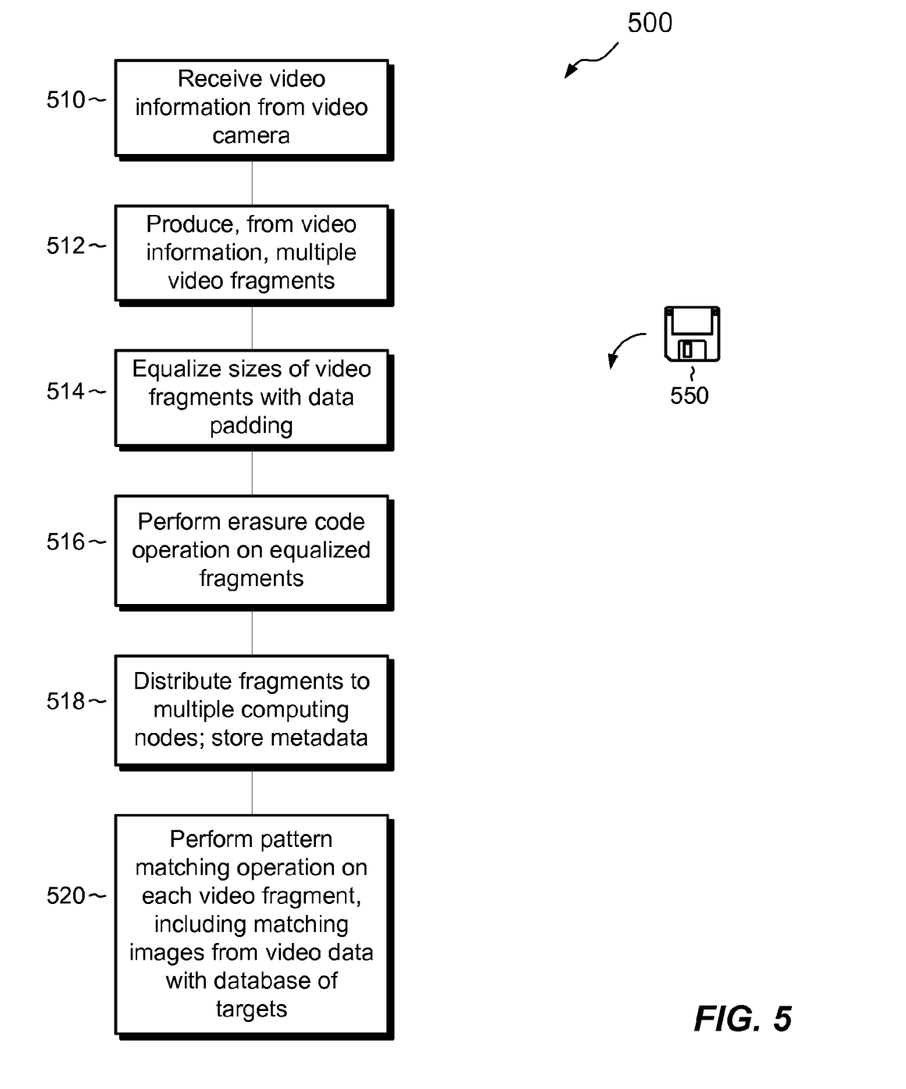
FIG. 5 is a flowchart showing an example process for distributed, parallel video processing, where different computing nodes of a network process and store video data for different video fragments.

FIG. 5 shows an example method 500 for acquiring, distributing, and processing distributed video data. In some examples, the method 500 is conducted by different computing nodes 112 of the network 120.

At step 510, a computing node 112, such as the computing node 112c, receives video information 130 from a video camera 114. The video information 130 may be in the form of a file, such as an MPEG-4 file, a video stream, or in some other form.

At step 512, multiple video chunks and fragments are produced, e.g., using techniques described in connection with FIG. 3 above. At step 514, the sizes of the video fragments for any given chunk are equalized, e.g., by padding smaller fragments in the chunk to be the same size as the largest fragment in the chunk. At step 516, an erasure coding operation is performed, e.g., by the erasure coding engine 450 of the erasure code manager 240.

At step 518, the unpadded video fragments and the parity fragments are distributed to multiple computing nodes. Fragments are placed according to a policy implemented by the data placement manager 250 of the computing node 112 on which the video data are acquired. Typically, each fragment, whether it be a video fragment or a parity fragment, is sent to a different computing node 112 on the network 120. Metadata are created to store the locations on the network 120 of all fragments placed, as well as the location of the video camera 114 that acquired the video data 130 from which the fragment was produced.

In some examples, the metadata themselves are distributed to one or more computing nodes 112 on the network 120 for distributed metadata storage. Video data may later be retrieved by accessing the metadata, identifying the locations of video fragments stored on the network 120, reassembling the fragments into chunks, and reassembling the chunks to reconstitute the original file. If any video fragments have been damaged, parity fragments may be accessed, using the metadata, and an erasure code algorithm may be run to reconstitute the damaged fragments.

At step 520, each computing node 112 that receives a video fragment performs an analysis operation on the fragment. The analysis operation may include a pattern matching operation, e.g., performed by the pattern matching engine 260 of the respective computing node 112. Examples of pattern matching operations include facial recognition and license plate matching. The video fragment received by each node 112 generally includes multiple frames, e.g., multiple I-frames and associated inter-frames. The respective nodes 112 process the inter-frames with their preceding I-frames to generate entire frames. Each entire frame (including both complete frames and processed inter-frames) is then searched for one or more predetermined targets, e.g., targets stored in the database 262. In some cases, the targets are known threats, such as dangerous persons, vehicles of dangerous persons, or stolen vehicles. In some examples, if a computing node 112 matches a video image to a known threat, the computing node 112 alerts a response service, such as police or federal officials, that the threat has been detected. The physical location of the video camera 114 where the suspected threat occurred may be read from metadata. The response service may then take action, as appropriate, to mitigate or otherwise respond to the threat.

As indicated, video fragments stored on the nodes 112 of the network 120 may be reassembled to reconstitute original video files or streams. In some examples, however, video processing by nodes 112 of the network 120 may proceed solely by analyzing individual video frames received in respective fragments. Complete video reconstruction is therefore not required in these cases. In other examples, subgroups of nodes 112 of the network 120 communicate with one another to reconstruct partial segments of video from fragments stored on different nodes 112, where it is desired to analyze motion of objects represented in different fragments stored on different nodes 112.

An improved technique has been described for storing and processing video data. The technique involves separating video data 130 derived from a video camera 114 into multiple video fragments (e.g., 140(1-6)), distributing the video fragments to different computing nodes 112 of a network 120, and performing parallel image processing, such as pattern matching, on the video fragments in a distributed manner, by the respective computing nodes 112 that receive the video data.

Since video data are processed by multiple computing nodes 112 in a distributed manner, individual CPUs are generally not overburdened, and the need for high-performance, centralized processors is avoided. Also avoided is much of the risk involved in centralized processing, where all data can be lost in response to a single event. If any of the distributed video fragments are damaged, the damaged fragments can be regenerated by applying erasure coding to other video fragments and parity fragments. A sufficient number of parity fragments can be provided to reduce risk of data loss to acceptable levels.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, it has been shown and described that video fragments (e.g., 140(1-6)) each contain an integer number of video sequences (e.g., 324(1-13)), where each video sequence includes a single complete frame and a set of succeeding inter-frames based on the respective complete frame. However, this is merely an example. Alternatively, fragments may contain other groupings of video data, such as complete frames only, complete frames with fewer than all associated inter-frames, or complete frames with truncated inter-frames.

Also, although embodiments have been described particularly with reference to MPEG-4 files, it is understood that the improvements herein apply to other video formats, such as H.264, for example, as well as to video streams, video feeds, and other sources of video data.

Also, as shown and described, a node 112 on the network 120 may include a video camera 114. However, nodes are not limited to including single cameras and may in some examples include multiple video cameras 114 where, for example, each video camera points in a different direction.

Also, although it is described that each computing node 112 receiving a video fragment performs a pattern matching operation, this is merely an example. Alternatively, computing nodes 112 can perform other analytic operations on the video fragments besides pattern matching. In some examples, different computing nodes 112 can perform different analytic operations, e.g., some can perform pattern matching whereas others perform other analytic operations.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 550 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A video processing method, comprising:
   receiving, by a controller, video information from a video camera coupled to the controller at a computing node of a network;
   producing, by the controller and from the video information received from the video camera, multiple video fragments;
   distributing the video fragments to multiple computing nodes of the network, including distributing different video fragments to different computing nodes of the network; and
   directing the computing node to which each video fragment is distributed to store the respective video fragment and perform a pattern matching operation on the video fragment to determine whether the video fragment includes a video representation of a predetermined target, the computing nodes thereby together performing multiple pattern matching operations for the same predetermined target on respective video fragments of the video information in a distributed, parallel manner.

2. The video processing method as recited in claim 1, further comprising:
   applying an erasure coding operation to a set of the video fragments to produce at least one parity fragment; and
   distributing each parity fragment to a different computing node of the network.

3. The video processing method as recited in claim 2, wherein applying the erasure coding operation includes:
   padding at least one of the video fragments of the set of video fragments with padded data so that all video fragments in the set of video fragments are the same size; and
   calculating the at least one parity fragment from the set of video fragments.

4. The video processing method as recited in claim 2, wherein distributing the video fragments includes distributing video fragments of unequal size, without padding.

5. The video processing method as recited in claim 2, further comprising creating metadata for storing the locations of computing nodes on the network to which the video fragments and parity fragments are distributed.

6. The video processing method as recited in claim 5, wherein the method further comprises storing the metadata on a computing node of the network other than the computing node that performs the receiving video information.

7. The video processing method as recited in claim 1, wherein the computing node coupled to the video camera is coupled to multiple video cameras, each acquiring video data for distribution to computing nodes of the network.

8. The video processing method as recited in claim 1, further comprising alerting a response service in response to the pattern matching operation detecting a match to the predetermined target.

9. The video processing method as recited in claim 1, wherein the pattern matching operation includes a facial recognition operation and wherein the predetermined target is an image of a person's face.

10. The video processing method as recited in claim 1, wherein the pattern matching operation includes an operation for matching an image represented in the video fragment with a license plate number.

11. The video processing method as recited in claim 1, wherein the video information received from the camera is received as one of a video file and a video stream.

12. A video processing method, comprising:
    receiving video information from a video camera;

producing, from the video information, multiple video fragments;

distributing the video fragments to multiple computing nodes of a network, including distributing different video fragments to different computing nodes of the network; and directing the computing node to which each video fragment is distributed to store the video fragment and perform a pattern matching operation on the video fragment to determine whether the video fragment includes a video representation of a predetermined target, wherein the video information includes video frames, and wherein producing multiple video fragments includes providing, in each video fragment, at least one video frame, wherein producing multiple video fragments further includes providing, in each video fragment, at least one complete video frame that forms a picture, and wherein producing multiple video fragments further includes providing, in each video fragment, at least one inter-frame in connection with a complete frame, wherein each inter-frame includes difference information relative to the respective complete frame.

13. The video processing method as recited in claim 12, wherein producing multiple video fragments further includes providing, within each video fragment, an integer number of video sequences, each video sequence including an MPEG-4 I-frame and a set of succeeding MPEG-4 inter-frames.

14. A computerized apparatus, comprising:
a video camera;
a controller, coupled to the video camera, the controller constructed and arranged to:
receive video information from the video camera;
produce, from the video information, multiple video fragments;
distribute the video fragments to multiple computing nodes of a network such that different video fragments are distributed to different computing nodes; and
direct each of the multiple computing nodes of the network to perform a pattern matching operation on each respective video fragment, to determine whether the video fragment includes a video representation of a predetermined target.

15. The computerized apparatus as recited in claim 14, wherein the controller is further constructed and arranged to:
apply an erasure coding operation to a set of the video the fragments to produce at least one parity fragment; and
distribute each parity fragment to a different computing node of the network,
wherein, in being constructed and arranged to apply the erasure coding operation, the controller is further constructed and arranged to
pad at least one video fragment of the set of video fragments with padded data so that all video fragments in the set of video fragments are the same size; and
calculate the at least one parity fragment from the set of video fragments including the padded video fragments.

16. The computerized apparatus of claim 14, wherein the computing nodes thereby together perform multiple pattern matching operations for the same predetermined target on respective video fragments of the video information in a distributed, parallel manner.

17. A non-transitory computer-readable medium having instructions which, when executed by a controller of a computerized apparatus, cause the controller to perform a video processing method, the video processing method comprising:
receiving video information from a video camera;
producing, from the video information, multiple video fragments;
distributing the video fragments to multiple computing nodes of a network, including distributing different video fragments to different computing nodes of the network; and
directing the computing node to which each video fragment is distributed to store the video fragment and perform a pattern matching operation on the video fragment to determine whether the video fragment includes a video representation of a predetermined target;
applying an erasure coding operation to a set of the video the fragments to produce at least one parity fragment; and
distributing each parity fragment to a different computing node of the network,
wherein applying the erasure coding operation includes
padding at least one fragment of the set of video fragments with padded data so that all video fragments in the set of video fragments are the same size; and
calculating the at least one parity fragment from the set of video fragments including the padded video fragments.

* * * * *